June 30, 1959 C. O. NYMAN 2,892,473
BATTERY WATERING DEVICE
Filed April 8, 1957
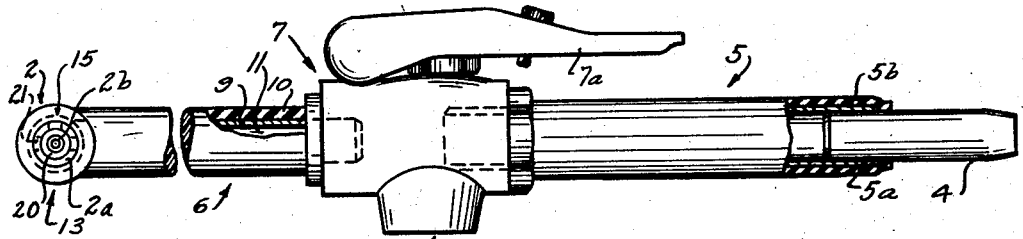
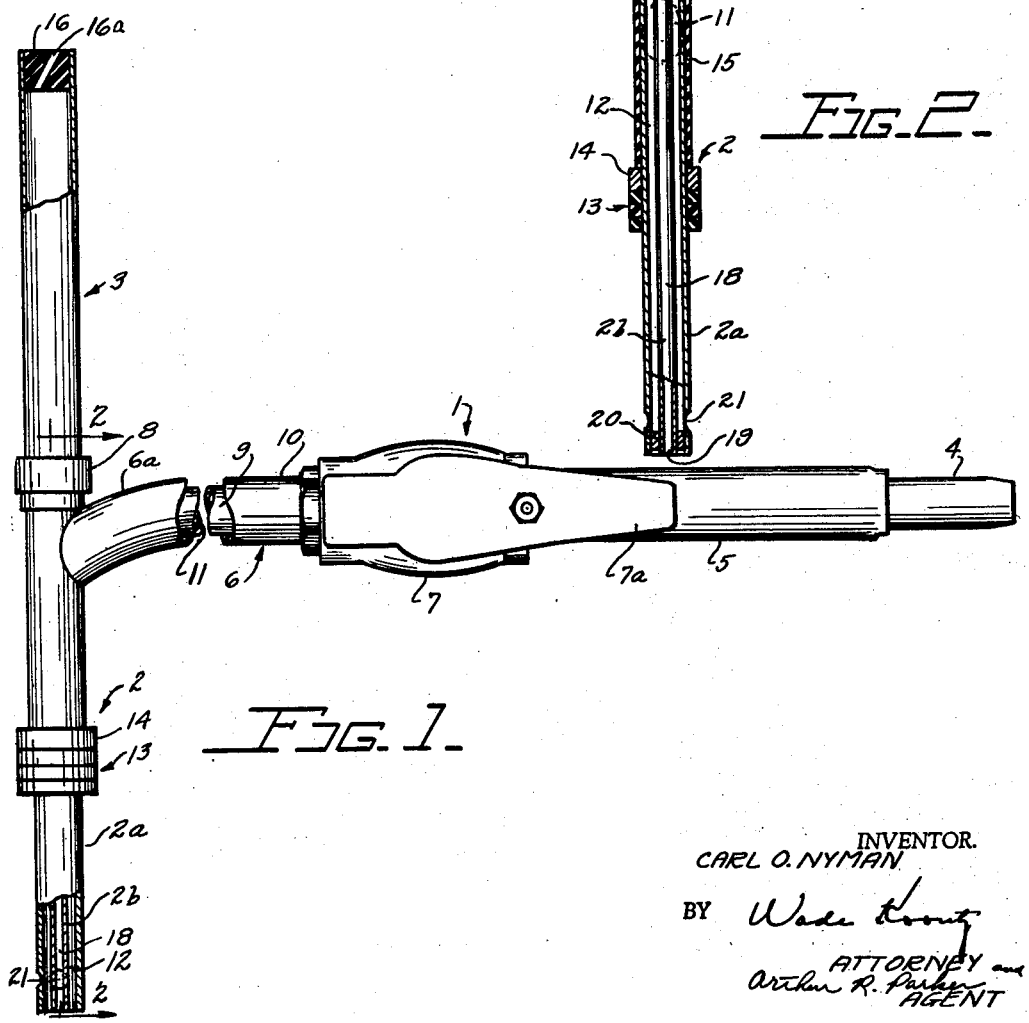
INVENTOR.
CARL O. NYMAN 2,892,473
Patented June 30, 1959

2,892,473

BATTERY WATERING DEVICE

Carl O. Nyman, Del Paso Heights, Calif., assignor to the United States of America as represented by the Secretary of the Air Force Application August 8, 1957, Serial No. 677,169

1 Claim. (Cl. 141—94)

(Granted under Title 35, U.S. Code (1952), sec. 266)

The invention described herein may be manufactured and used by or for the United States Government for governmental purposes without payment to me of any royalty thereon.

This invention relates generally to a battery or other receptacle filling device and, more particularly, to unique means for filling a battery or other receptacle and positively indicating when the liquid level therein has reached a predetermined point.

In the use of some means for filling batteries or other receptacles to a desired liquid level, it is essential that the device utilized be simple in construction and yet facilitate rapid and dependable operation. At the same time, said device should incorporate some means for indicating when the liquid utilized has reached the desired level especially in order to avoid excessive loss of electrolyte as in the case of a battery. With the bulb type of watering device, it has been found slow, nonuniform and highly unsatisfactory for ensuring that the proper liquid level is maintained. Moreover, with such a system, some means of illuminating the work area is frequently required. Furthermore, it is essential from the standpoint of safety that such a watering device avoid the possibility of hazard or danger from commingling of hydrogen and oxygen as when using certain types of fillers employing electrical contacts for signalling when the electrolyte has reached the predetermined level.

An object of the present invention, therefore, involves an improved battery watering device incorporating unique indicating means assuring that a predetermined liquid level is attained.

A further object of the invention utilizes a simple watering device for facilitating rapid filling of receptacles and including a simple and yet foolproof arrangement for substantially eliminating overflow.

A still further object of the invention provides a battery watering gun having pressure means for visually indicating the level of water being admitted into the battery cell and thereby eliminating unnecesary loss of electrolyte.

Other objects and advantages of the invention will become apparent from the following description, taken in connection with the accompanying drawings, in which like reference characters refer to like parts in the several figures:

Fig. 1 is a side view of the battery watering device utilized in the invention, illustrating the relationship between the handle and the several fluid passages in communication therewith.

Fig. 2 is a longitudinal sectional view taken about on section 2—2 of Fig. 1, illustrating the relationship between the fluid admission passage of the handle and the communicating passage in the head.

Fig. 3 is a second view of the battery watering device of Fig. 1 but rotated 90° to illustrate additional details of construction.

Referring specifically to Fig. 1 of the drawings, the battery watering device or gun of the invention consists of a handle 1, a head 2, and an indicator tube 3. Handle 1 consists of a tail portion 4, a body portion 5, a neck portion 6, and a valve and valve lever 7 and 7a, respectively. Each of said portions are hollow and have communicating fluid passages which will be hereinafter described in detail. Neck portion 6 terminates in an arcuate portion 6a affixed to said head 2 as by soldering with silver solder adjacent to one end thereof. Said indicator tube 3 is secured to the upper end of said head 2 as by a clamp 8. Said neck portion 6 consists of an inner brass tubing 9 surrounded by an outer cover tubing 10 in snug fit relation thereto with a fluid passage 11 extending therethrough from valve 7 and communicating with an outer fluid passage 12 in head 2 the details of which will be explained hereinafter with particular reference to Fig. 2 of the drawings. At this point, it is noted valve 7 may be of any standard, commercial type, the details of which are unimportant to the invention.

Referring particularly to Fig. 3 of the drawing, it is seen clearly that body portion 5 of handle 1 consists of a metal pipe 5a covered with a ⅜ inch standard rubber tubing 5b, 5 inches in length, and attached at one end to said valve 7. At the other end of said pipe 5a, one end of tail portion 4 is inserted and soldered in place as by silver.

As seen clearly in Fig. 2 of the drawings, the head 2 consists of an outer brass tubing 2a having a ½ inch outside diameter, a 0.065 inch wall thickness and 6½ inches in length, and an inner copper tubing 2b having a ³⁄₁₆ inch outside diameter, a 0.032 inch wall thickness and 6½ inches in length. Positioned adjacent to each other and in fixed circumferential relation to said tubing 2a are a plurality of rubber washers 13 and a naval brass ring 14, the purpose of which will be explained hereinafter. Said washers 13 and ring 14 are located on the circumference of said head 2 approximately half-way between the opposite ends thereof. An outside rubber tubing 15 covers the upper half of said tubing 2a. The previously mentioned indicator tube 3, which consists of a clear plastic material and is clamped on head 2 as clearly seen in Figs. 1 and 2 by means of clamp 8 is closed at its upper end by means of a rubber plug 16 having a vent aperture 16a. Since the inner tubing 2b is substantially less in diameter than the outer tubing 2a, a fluid passage 12 is formed in said outer tubing 2a preferably spaced in concentric relation to said inner tubing 2b, which fluid passage 12 is in open communication with the fluid passage 11 previously described as formed in the neck portion 6 of handle 1 and shown in dotted lines in Fig. 2. Within said inner tubing 2b, another fluid passage 18 is formed, which fluid passage 18 terminates in an opening 19 at its lower end, the latter opening 19 being in communication within the interior of a selected battery cell when said head 2 is inserted therein, at its other end, said fluid passage 18 is in open communication with the interior of indicator tube 3. A naval brass plug 20 is utilized to seal the space between said inner and outer tubings, 2b and 2a, adjacent said opening 19 as by soldering. Incorporated in said outer tubing 2a immediately above said plug 20 are a plurality of circumferentially arranged openings 21 which openings 21 are in open communication with said fluid passage 12. The latter openings 21 are also in communication with the interior of said battery cell when it is desired to fill the same to the required liquid level.

In order to fill the various cells of a battery, the lower or uncovered half of the head 2 is inserted into a selected cell (not shown) until rubber washers 13 are in snug and air-tight relation with respect to the filler opening, the valve 7 is then opened by means of depressing valve lever 7a to cause water to flow through handle 1 into fluid passage 11. From said fluid passage 11 the water continues to flow into the communicating fluid passage 12 in head 2 and from there into the selected battery cell by means of openings 21 to progressively force out any air therein as the water level rises in said battery cell. Since washers 13 on outer tubing 2a are in snug-fit relation in the battery cell filler opening, the flow of air out of said cell is restricted to the fluid passage 18 and because of the relatively restricted opening 19 of said fluid passage 18 thereby gives rise to pressure within the battery followed by a relatively rapid and large rise of water level within the indicator tube 3 with a very little increase in water level in said battery. Thus, the water continues to flow into the selected cell by way of the openings 21 until the proper level is reached as determined by the end of opening 19, at which point any additional water admitted into the battery cell is forced upwardly through the relatively small fluid passage 18 in the inner tubing 2b into the clear plastic indicator tube 3, which enables the operator or user of the battery watering device or gun of the invention to see the rising water and, immediately thereafter release pressure on valve lever 7a to close valve 7 and stop the flow of water. At this time, the required predetermined level of water in said cell will have been reached. It is noted that the vent aperture 16a ultimately vents to atmosphere air forced out of the selected battery cell and upwardly through the fluid passage 18; however, the flow of said air is substantially restricted as indicated above by the relative size of the opening 19 to result in a pressure on the rising water within the battery cell. Thus, once the water level reaches opening 19, a small additional rise therein effects a large rise of water level in indicator tube 3.

Thus, a new and unique battery watering device has been developed in the present invention wherein a simple means of filling the various cells of a battery to their proper level is accomplished in an efficient and rapid manner and, at the same time, combined with an improved indicator means for assuring that excessive loss of electrolyte is eliminated.

I claim:

Means adapted for filling a receptacle with liquid comprising a head portion having a fluid admission tube hollow throughout its length and open at both ends to form a relatively large passage therein admitting liquid to said receptacle, a second tube mounted adjacent to said fluid admission tube and hollow throughout its length and open at both ends to form a relatively small fluid passage therein receiving overflow of said liquid admitted to said receptacle, plug means at the lower end of said tubes, sealing said tubes relative to each other, a plurality of circumferentially disposed opening means in said fluid admission tube communicating with the fluid passage therein and admitting liquid into said receptacle and an axial opening in said second tube communicating with the fluid passage therein and directing air out of said receptacle on admitting liquid thereinto, a transparent indicator tube attached to the upper end of said second tube having a fluid passage communicating with said relatively small fluid passage, an elongated handle affixed to said head portion and having a fluid passage in communication with said relatively large fluid passage, and means in said handle directing admission of fluid into said receptacle through said communicating fluid passages, said handle comprising a tubular tail portion, a rubber cover surrounding said tail portion, an elongated tubular neck portion attached to said fluid admission tube, and a valve mechanism between said neck portion and said tail portion operable to admit fluid to said communicating fluid passage of said neck portion.

References Cited in the file of this patent

UNITED STATES PATENTS

| 96,833 | Phillips | Nov. 16, 1869 |
| 487,866 | Kiefer | Dec. 13, 1892 |
| 752,992 | Miller | Feb. 23, 1904 |
| 1,216,574 | Kiefer | Feb. 20, 1917 |
| 2,658,653 | Mahan | Nov. 10, 1953 |

FOREIGN PATENTS

| 25,996 | France | Mar. 19, 1923 |
| 616,804 | France | Nov. 2, 1926 |